US007637191B2

(12) United States Patent
Zeeb et al.

(10) Patent No.: US 7,637,191 B2
(45) Date of Patent: Dec. 29, 2009

(54) PRODUCT TABLE LOCK FOR A FOOD SLICER

(75) Inventors: Scott M. Zeeb, Chicago, IL (US); Scott J. Rote, New Lenox, IL (US); Aaron B. Eiger, Chicago, IL (US); Todd L. Clem, Goshen, IN (US)

(73) Assignee: Premark FEG L.L.C., Wilmington, DE (US)

( * ) Notice: Subject to any disclaimer, the term of this patent is extended or adjusted under 35 U.S.C. 154(b) by 323 days.

(21) Appl. No.: 11/349,354

(22) Filed: Feb. 7, 2006

(65) Prior Publication Data

US 2007/0044622 A1 Mar. 1, 2007

Related U.S. Application Data

(60) Provisional application No. 60/711,792, filed on Aug. 26, 2005.

(51) Int. Cl.
*B23D 19/00* (2006.01)

(52) U.S. Cl. ............................ 83/703; 83/714; 83/729; 83/412; 83/932

(58) Field of Classification Search ................... 83/663, 83/676, 729, 703, 730, 719, 714, 707, 412, 83/932
See application file for complete search history.

(56) References Cited

U.S. PATENT DOCUMENTS

| | | | | |
|---|---|---|---|---|
| 2,476 | A | 2/1842 | Morris | |
| 19,982 | A | 4/1858 | Conroy | |
| 28,179 | A | 5/1860 | Hunter | |
| 1,424,875 | A | 8/1922 | Braun | |
| 1,428,292 | A | 9/1922 | Lucey | |
| 1,939,740 | A | 12/1933 | Van Berkel | |
| 1,948,811 | A | 2/1934 | Van Berkel | |
| 1,972,250 | A * | 9/1934 | Strachan et al. | 83/730 |

(Continued)

FOREIGN PATENT DOCUMENTS

| | | |
|---|---|---|
| DE | 3827404 | 2/1990 |

(Continued)

OTHER PUBLICATIONS

International Preliminary Report on Patentability, International Application PCT/US2006/31605; Mar. 6, 2008; 7 pages.

*Primary Examiner*—Boyer D Ashley
*Assistant Examiner*—Omar Flores-Sánchez
(74) *Attorney, Agent, or Firm*—Thompson Hine LLP

(57) ABSTRACT

A food slicer has a support member including a base portion and an upstanding portion. The upstanding portion includes a rotating cutting blade for slicing food product and at least one motor for rotating the cutting blade. The base portion includes a food product table movable across the cutting blade for holding product while it is being sliced. An adjustable gage plate as well as a gage plate adjustment mechanism are provided for slice thickness adjustment. A table interlock mechanism includes at least one cable member in operable communication with the gage plate adjustment mechanism where a distal end of the cable member is lockable within a portion of the gage plate adjustment mechanism upon longitudinal movement of the cable member substantially parallel to the axis of the gage plate adjustment mechanism when both the food product table and the gage plate are positioned in particular positions.

8 Claims, 7 Drawing Sheets

U.S. PATENT DOCUMENTS

| | | | | |
|---|---|---|---|---|
| 1,977,418 | A | | 10/1934 | Winkler |
| 2,026,096 | A | | 12/1935 | Muhlbauer |
| 2,052,365 | A | | 8/1936 | Stoked |
| 2,052,367 | A | | 8/1936 | Folk |
| 2,486,797 | A | | 11/1949 | Meyer |
| 2,563,120 | A | | 8/1951 | Klingens et al |
| 2,573,629 | A | | 10/1951 | Klingens et al |
| 2,598,740 | A | | 6/1952 | Zimmermann |
| 2,614,373 | A | | 10/1952 | Van Duyn et al |
| 2,665,531 | A | | 1/1954 | Sivertsen |
| 2,728,176 | A | | 12/1955 | Ritzert |
| 3,051,207 | A | | 8/1962 | Hartley |
| 3,124,185 | A | | 3/1964 | Karp |
| 3,176,560 | A | | 4/1965 | Bardenhagen |
| 3,182,700 | A | | 5/1965 | Engi |
| 3,319,681 | A | | 5/1967 | Anecki |
| 3,320,990 | A | | 5/1967 | Anecki |
| 3,442,312 | A | | 5/1969 | Karp |
| 3,452,833 | A | | 7/1969 | Wolters |
| 3,583,452 | A | | 6/1971 | Muller |
| 3,613,754 | A | | 10/1971 | Hartley |
| 3,672,420 | A | | 6/1972 | Hartley |
| 3,677,316 | A | | 7/1972 | Markham |
| 3,704,736 | A | * | 12/1972 | Pratley ........................ 83/397 |
| 3,706,736 | A | | 12/1972 | Pratley |
| 3,713,470 | A | | 1/1973 | Muller |
| 3,736,825 | A | | 6/1973 | Covell |
| 3,739,677 | A | | 6/1973 | Muller |
| 3,772,951 | A | | 11/1973 | Repetto |
| 3,782,230 | A | | 1/1974 | Bettcher |
| 3,857,310 | A | | 12/1974 | Tiby |
| 3,871,260 | A | | 3/1975 | Rees |
| 3,938,602 | A | | 2/1976 | Sly et al. |
| 3,958,475 | A | | 5/1976 | Zapomel |
| 3,958,478 | A | | 5/1976 | Camper |
| 3,965,783 | A | | 6/1976 | Muller |
| 3,986,304 | A | | 10/1976 | Shie |
| 4,015,494 | A | | 4/1977 | Spooner |
| 4,186,634 | A | | 2/1980 | Akczinski, Sr. |
| 4,227,656 | A | | 10/1980 | Engebretsen |
| 4,246,818 | A | | 1/1981 | McGraw, Jr. |
| 4,266,456 | A | | 5/1981 | Oostvogels |
| D259,883 | S | | 7/1981 | Engebretsen |
| 4,306,385 | A | | 12/1981 | Burton |
| 4,386,483 | A | | 6/1983 | Schlaefli |
| 4,397,206 | A | * | 8/1983 | Czala .......................... 83/399 |
| 4,434,694 | A | | 3/1984 | Scharsig |
| 4,499,804 | A | | 2/1985 | Takeda |
| 4,528,777 | A | | 7/1985 | Bernstein et al. |
| 4,532,840 | A | | 8/1985 | Antonissen |
| 4,541,319 | A | | 9/1985 | Maurer et al. |
| 4,543,868 | A | | 10/1985 | Maurer et al. |
| 4,546,685 | A | | 10/1985 | Maurer et al. |
| 4,653,373 | A | | 3/1987 | Gerber |
| 4,685,364 | A | | 8/1987 | Scheflow et al. |
| 4,732,056 | A | | 3/1988 | Foster |
| 4,732,064 | A | | 3/1988 | Pearl |
| 4,793,228 | A | | 12/1988 | Etter et al. |
| 4,811,521 | A | | 3/1989 | Nakae et al. |
| 4,813,316 | A | | 3/1989 | Johnson et al. |
| 4,817,480 | A | | 4/1989 | Young |
| 4,829,721 | A | | 5/1989 | Wright |
| 4,962,581 | A | | 10/1990 | Rutigliano |
| 5,001,887 | A | | 3/1991 | Eder et al. |
| 5,038,647 | A | | 8/1991 | Biagiotti |
| 5,101,704 | A | | 4/1992 | Jones et al. |
| 5,152,105 | A | | 10/1992 | Belvederi |
| 5,188,011 | A | | 2/1993 | Somal et al. |
| 5,209,150 | A | | 5/1993 | Arconada |
| 5,224,407 | A | | 7/1993 | Koch et al. |
| 5,241,885 | A | | 9/1993 | Kuchler |
| 5,461,957 | A | | 10/1995 | Koch et al. |
| 5,509,337 | A | | 4/1996 | Norman |
| 5,615,591 | A | | 4/1997 | Scherch et al. |
| 5,649,463 | A | | 7/1997 | Lindee et al. |
| 5,666,866 | A | | 9/1997 | Huang et al. |
| 5,687,626 | A | | 11/1997 | Scherch et al. |
| 5,787,776 | A | | 8/1998 | Nishimoto |
| 5,941,148 | A | | 8/1999 | Miller et al. |
| 5,970,840 | A | | 10/1999 | Yan et al. |
| 6,016,734 | A | | 1/2000 | Koch |
| 6,092,448 | A | | 7/2000 | Cartwright et al. |
| 6,092,450 | A | | 7/2000 | Dueck |
| 6,167,791 | B1 | | 1/2001 | Heckman et al. |
| 6,209,438 | B1 | | 4/2001 | Mitchell et al. |
| D463,713 | S | | 10/2002 | Zhu |
| 7,073,421 | B1 | * | 7/2006 | Verhalen et al. ............... 83/174 |
| 2001/0018317 | A1 | | 8/2001 | Yan |
| 2001/0049987 | A1 | | 12/2001 | Vivirito et al. |

FOREIGN PATENT DOCUMENTS

| | | | |
|---|---|---|---|
| EP | 0115788 | A1 | 8/1984 |
| EP | 0202777 | A2 | 11/1986 |
| EP | 0248354 | A2 | 12/1987 |
| EP | 0724931 | A1 | 8/1996 |
| EP | 0776265 | A1 | 6/1997 |
| EP | 0827816 | A1 | 3/1998 |
| EP | 0 881 045 | A2 | 12/1998 |
| EP | 0972619 | A2 | 1/2000 |
| GB | 1560874 | | 2/1978 |
| GB | 2021452 | A | 12/1979 |
| GB | 2061780 | A | 5/1981 |
| WO | WO 94/11279 | | 5/1994 |
| WO | WO 95/32846 | | 12/1995 |
| WO | WO 95/33601 | | 12/1995 |
| WO | WO 96/05952 | | 2/1996 |
| WO | WO 98/55277 | | 12/1998 |
| WO | WO 00/40367 | | 7/2000 |
| WO | WO 00/66333 | | 11/2000 |

* cited by examiner

PRODUCT TABLE LOCK FOR A FOOD SLICER

CROSS-REFERENCE TO RELATED APPLICATIONS

This application claims benefit of U.S. provisional patent application Ser. No. 60/711,792, filed Aug. 26, 2005, which is herein incorporated by reference.

TECHNICAL FIELD

The present invention relates generally to food slicers and more particularly to a locking mechanism for a food product table of a food slicer that provides for an enhanced sanitary environment, enables easier operation and cleaning and incorporates a number of enhanced ergonomic features.

BACKGROUND

The basic design of both manual and automatic food slicers has proven to be quite effective and durable throughout the years. Although various important improvements have been made to such slicers, the overall design has not changed very much particularly with regard to the overall cleanliness, ergonomics, or ease of operation.

Today, food slicers are utilized to slice a number of food products such as meats, cheeses and the like in a variety of environments such as delicatessens, supermarkets, and restaurants to name a few. Such food slicers need to be quite durable since they tend to be used for many hours during a day by many different individuals while providing the desired performance and cleanliness.

Additionally, food slicers need to be designed to allow adaptability since they need to handle a variety of products of different shapes, sizes, and textures while readily providing slices of different thicknesses of the product being sliced. The speed at which a particular product is moved across the cutting blade can also vary on automatic food slicers to improve productivity.

Three major components of a food slicer typically are a rotating blade, a food product table for holding food product to be sliced that moves back and forth across the cutting blade, and an adjustable gage plate that moves with respect to the blade to provide a slice thickness gap therebetween corresponding to the thickness of the desired slice. To enable easier cleaning of a food slicer, the product table can be designed to be removable from the food slicer. Mechanical or electromechanical methods are provided to only enable removal of the product table when both the product table and gage plate are in a particular position with respect to the blade.

SUMMARY

In accordance with an embodiment, a food slicer is provided having a support member including a base portion and an upstanding portion integrally formed with the base portion. The upstanding portion includes a rotating cutting blade secured thereto for slicing food product and at least one motor positioned within the upstanding portion for rotating the cutting blade.

The base portion includes a food product table slidably secured thereto and is movable across the cutting blade for holding product while it is being sliced by the cutting blade. An adjustable gage plate also is provided for determining the thickness of a food product to be sliced by the cutting blade as well as a gage plate adjustment mechanism for adjustment of said gage plate by an operator where the gage plate adjustment mechanism is rotatable about an axis.

A table interlock mechanism is included for preventing removal of the food product table from the food slicer unless the food product table and the gage plate are in particular positions with respect to the food slicer. The interlock mechanism includes at least one cable member in operable communication with the gage plate adjustment mechanism where a distal end of the cable member proximate the gage plate adjustment mechanism is lockable within a portion of the gage plate adjustment mechanism upon longitudinal movement of the cable member substantially parallel to the axis of the gage plate adjustment mechanism when both the food product table and the gage plate are positioned in their particular positions.

BRIEF DESCRIPTION OF THE DRAWINGS

The present disclosure will become better understood with reference to the following description and accompanying drawings, wherein.

DETAILED DESCRIPTION

Figure 1:
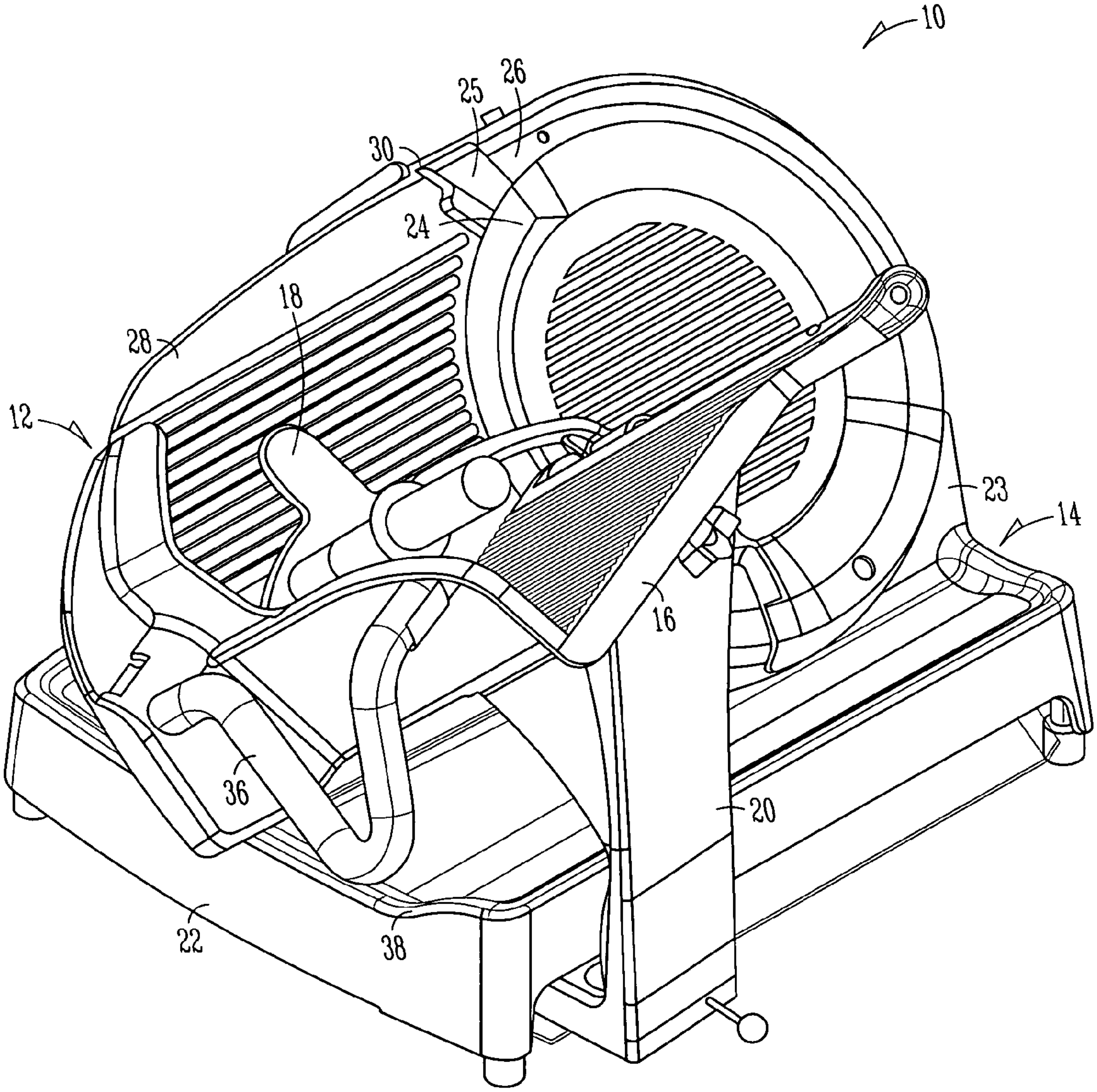
FIG. 1 is a top right perspective view of a food slicer according to one embodiment of the present invention.
Figure 2:
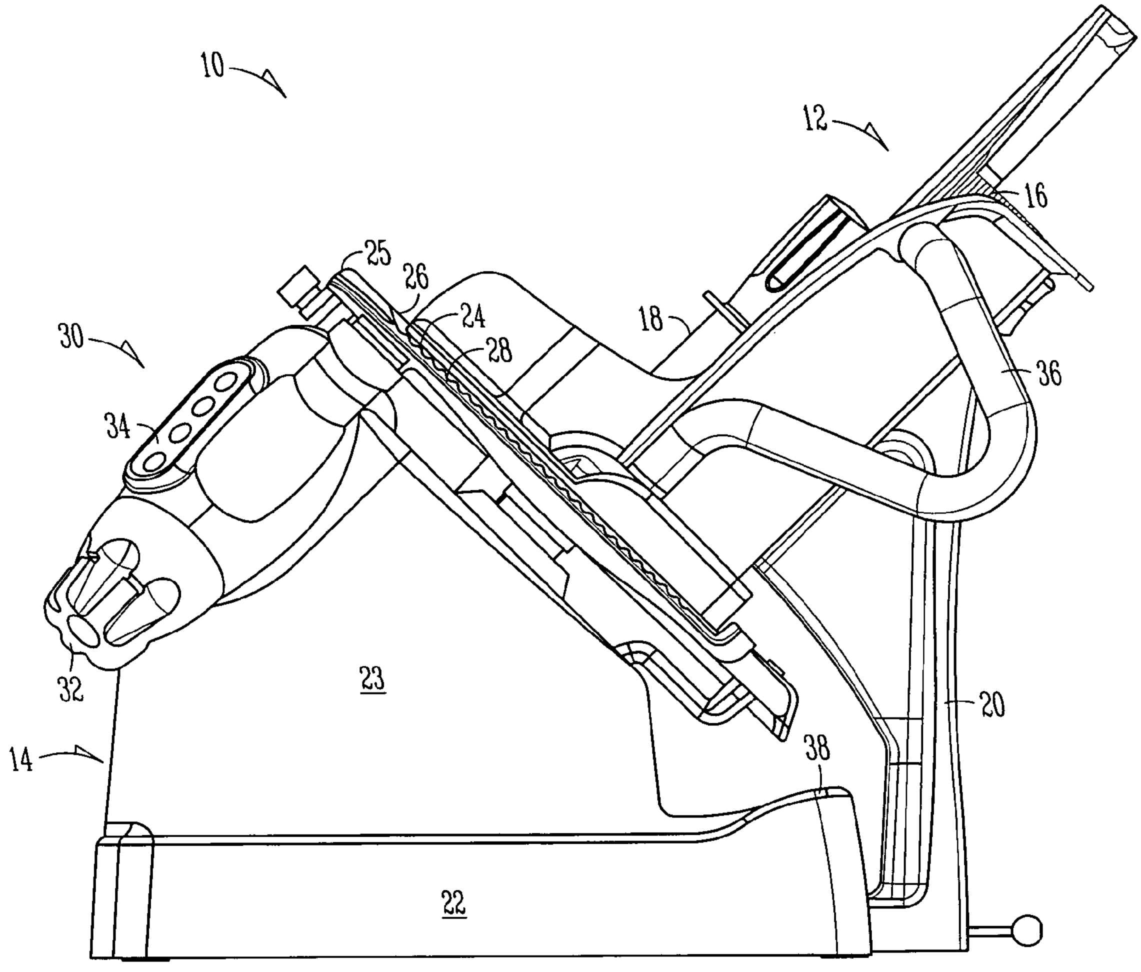
FIG. 2 is a front plan view of the food slicer of FIG. 1.

The food slicer of the present invention is generally illustrated by numeral 10 of FIGS. 1-2 wherein like parts are designated by like reference numerals. Although the present disclosure will be described with reference to the example embodiments illustrated in the figures, it should be understood that the food slicer 10 may have many alternative forms without departing from the teachings of the present invention. One of ordinary skill in the art will additionally appreciate different ways to alter the parameters of the embodiments disclosed, such as the size, shape, or type of elements or materials, in a manner that falls within the spirit and scope of the present disclosure and appended claims.

FIGS. 1 and 2 illustrate the basic components of the food slicer 10 of the present invention. The food slicer 10 substantially includes a food handling portion generally illustrated by reference numeral 12 and a support portion, housing or member generally illustrated by reference numeral 14.

The food handling portion 12 substantially includes a product table 16, a push arm or pusher 18 and a product table support arm 20. The support portion 14 substantially includes a base portion or member 22, an upstanding portion or member 23, a rotating circular slicing knife or cutting blade 24, a ring guard 25, a knife cover 26, an adjustable gage plate 28 for determining slicing thickness and a control member or operator interface 30 having a gage plate support and adjustment mechanism 32 for the gage plate 28 and control buttons 34 as illustrated in FIG. 2.

The support portion 14 also includes at least one motor (not illustrated) positioned within the inside of the upstanding portion 23. If desired, a second motor (not illustrated) may be positioned within the inside of the support portion 14 along with associated structure for automatically moving the product table 16.

Briefly, for manual slicing, a food product (not illustrated) is placed on the product table 16 beneath the pusher 18 with the end to be cut or sliced resting upon the gage plate 28 with the product table 16 in its forward position. The operator adjusts the gage plate adjustment mechanism 32 which directly moves the gage plate 28 with respect to the blade 24 to provide a slice thickness gap therebetween that corresponds to the desired thickness for slicing of the product and gets bigger with thicker slices. The control buttons 34 are then accessed to turn the motor on which in turn rotates the blade 24.

The operator then pushes the product table 16 preferably via a handle 36 or other contact point forward or to the right with respect to FIG. 1 whereby the blade 24 slices the product to the desired thickness. The operator then pulls the product table 16 backward or to the left with respect to FIG. 1 for continued slicing of the product as described above.

For ease of cleaning, the product table 16 is designed to be removed from the food slicer 10. It is desirable to provide measures to prevent removal of the product table 16 unless the gage plate 28 is in a fully closed position with respect to the blade 24 and the product table 16 is in its fully forward or "home" position.

Figure 3:
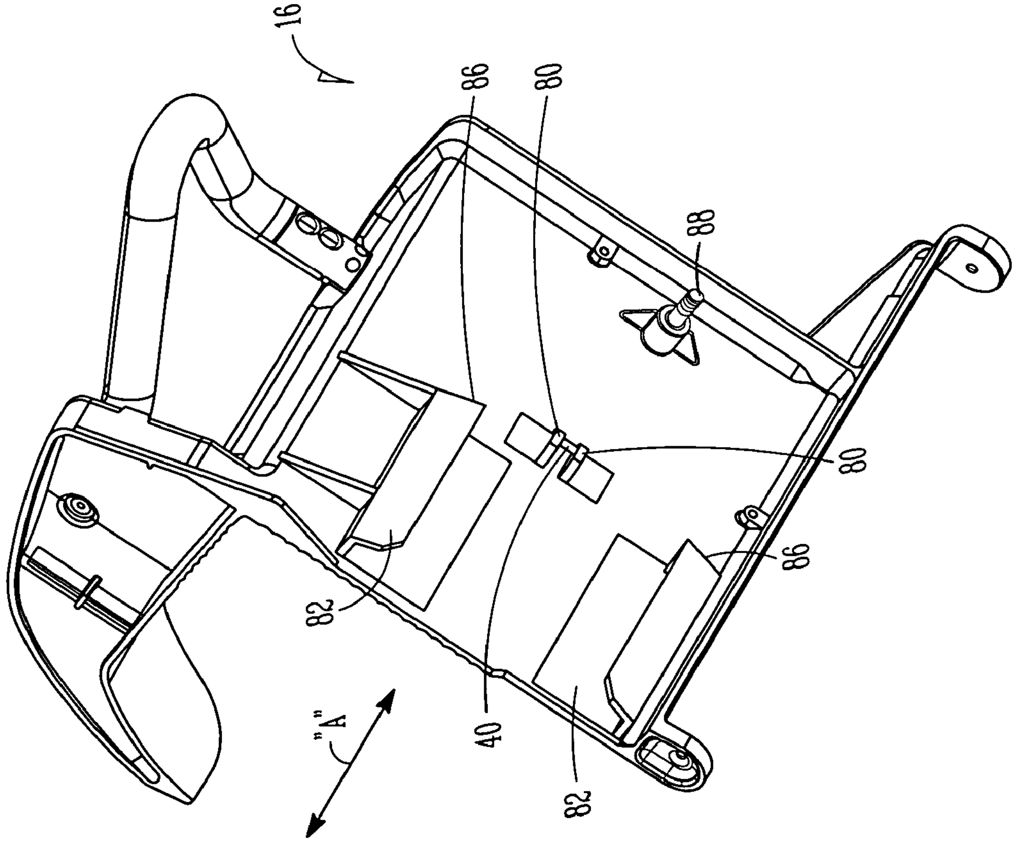
FIG. 3 is a bottom perspective view of a food product table of the food slicer of FIGS. 1 and 2.
Figure 5:
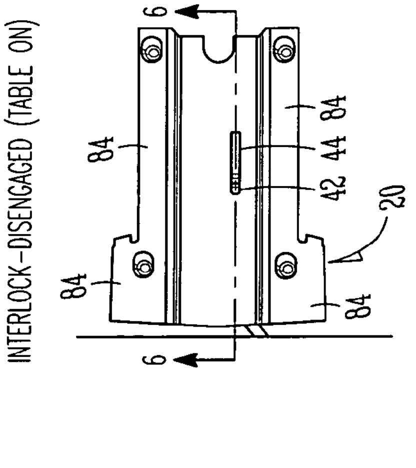
FIG. 5 is a top plan view of the support arm of FIG. 4 illustrating a portion of the interlock mechanism in the disengaged position where the product table would be secured thereto.

The food slicer 10 provides such features by a unique interlock mechanism linking the product table 16, support arm 20 and gage plate adjustment mechanism 32 as will be explained in detail herein. Briefly, to ensure removal of the product table 16 only when the gage plate 28 is in its fully closed position and the product table 16 is in its home position, the underside of the product table 16 includes a pin 40 (FIG. 3.)

When secured to the support arm 20, the pin 40 engages within a recess 42 formed in a substantially circular flat disc or actuator member 44 (FIGS. 5-8). When the product table 16 is removed from the slicer 10, the disc 44 rotates clockwise from an interlock "disengaged" position of FIGS. 5 and 6 where the product table 16 is attached to the support arm 20 to an interlock "engaged" position of FIGS. 7 and 8 where the product table 16 is removed from the support arm 20.

Figure 7:
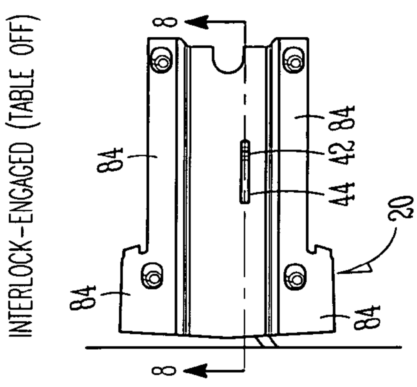
FIG. 7 is a top plan view of the support arm similar to FIG. 5 but illustrating a portion of the interlock mechanism in the engaged position where the product table would be removed from the support arm.
Figure 8:
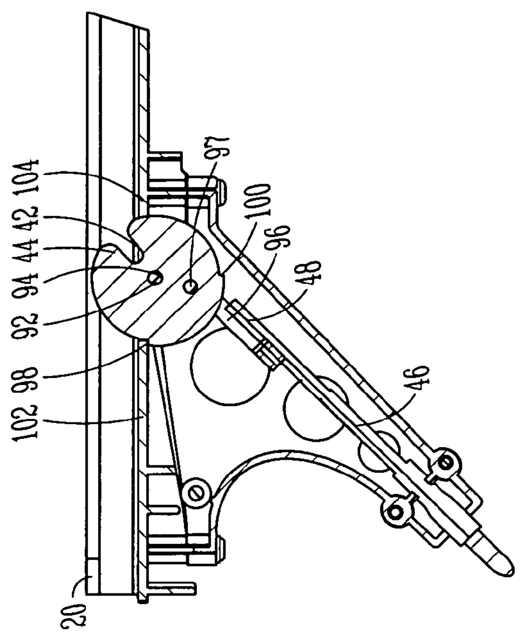
FIG. 8 is a cross-sectional view of the support arm taken along lines 8-8 of FIG. 7 with portions of the support arm cut away.

It is to be understood that the interlock engaged position of FIGS. 7 and 8 can only be achieved when the gage plate 28 is in its fully closed position and the product table 16 is in its home position as described herein. Also, once the gage plate 28 is fully closed and the product table 16 is in its home position, the interlock mechanism provides the desired features automatically upon removal of the product table 16 with no additional adjustments needed by the operator. Once in the engaged position, the gage plate 28 cannot be opened and the support arm 20 cannot move with respect to the slicer 10.

As FIGS. 6, 8, 9 and 10 illustrate, the disc 44 is operably connected to a first dual acting (push/pull) cable 46 at its first end 48 so that when the disc 44 rotates clockwise to the engaged position of FIGS. 7 and 8 a second end 50 (FIGS. 4 and 11) of the first cable 46 moves downward within the support arm 20. When the product table 16 is later installed on the support arm 20 after cleaning, the disc 44 rotates counterclockwise to the disengaged position of FIGS. 5 and 6 thereby pulling the first cable 46 upward within the support arm 20.

Figure 11:
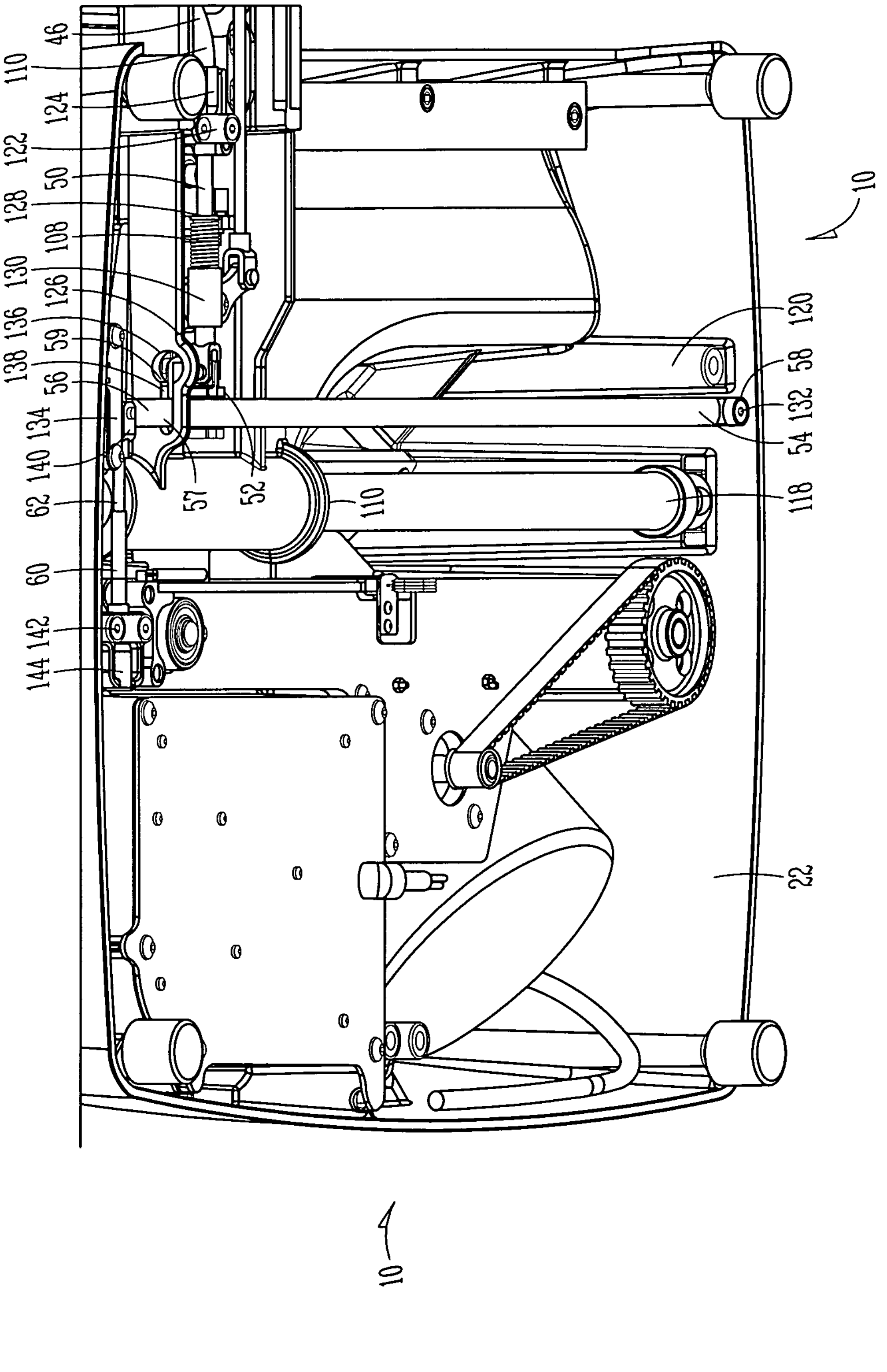
FIG. 11 is a bottom perspective view of the food slicer of FIGS. 1 and 2 illustrating a portion of the interlock mechanism.

As FIG. 11 illustrates, the second end 50 of the cable 46 is connected to a slider member 52 designed for movement along an interlock shaft 54 during slicing operation of the slicer 10. The interlock shaft 54 is substantially circular in cross-section having a first end 56 with a flat portion 57 and a second opposite end 58.

Only when the product table 16 is in the home position of FIG. 11 can the first cable 46 move the flat portion 57 of the first end 56 of the interlock shaft 54 within an interlock fork member 59 from right to left with respect to FIG. 11 from an interlock disengaged position (not illustrated) to the interlock engaged position of FIG. 11. The interlock fork member 59 is connected to or formed as a part of the support arm 20 and moves along with the support arm 20 and product table 16 during slicing. If the support arm 20 and product table 16 are in another position along the interlock shaft 54 other than the home position the interlock fork 59 engages with a round portion of the interlock shaft 54 not the flat portion 57 and the shaft 54 cannot move to the engaged position of FIG. 11.

Figure 13:
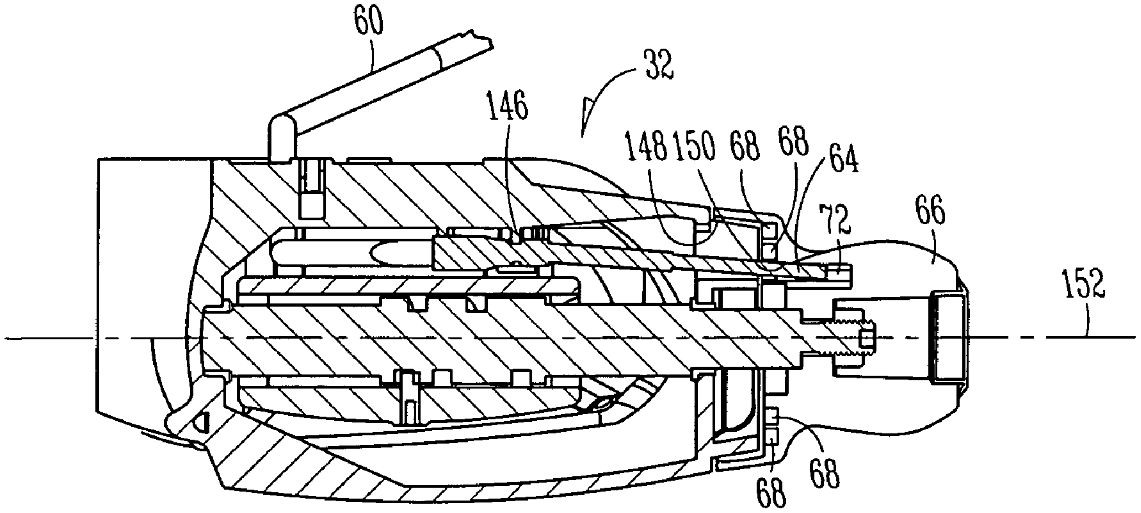
FIG. 13 is a partial cross-sectional view of the operator interface mechanism of the food slicer of FIGS. 1 and 2 illustrating a cable end extending through an aperture of a housing member and seated within a detent portion of the helical groove of the adjustment knob of FIG. 12.

The first end 56 of the interlock shaft 54 also is connected to a second dual acting (push/pull) cable 60 having a first end 62 and a second end 64 (FIG. 13). The first end 62 is connected to the interlock shaft 54 while the second end 64 is in operable communication with a knob 66 of the gage plate adjustment mechanism 32 illustrated in FIG. 13 in the fully closed position of the gage plate 28.

Figure 12:
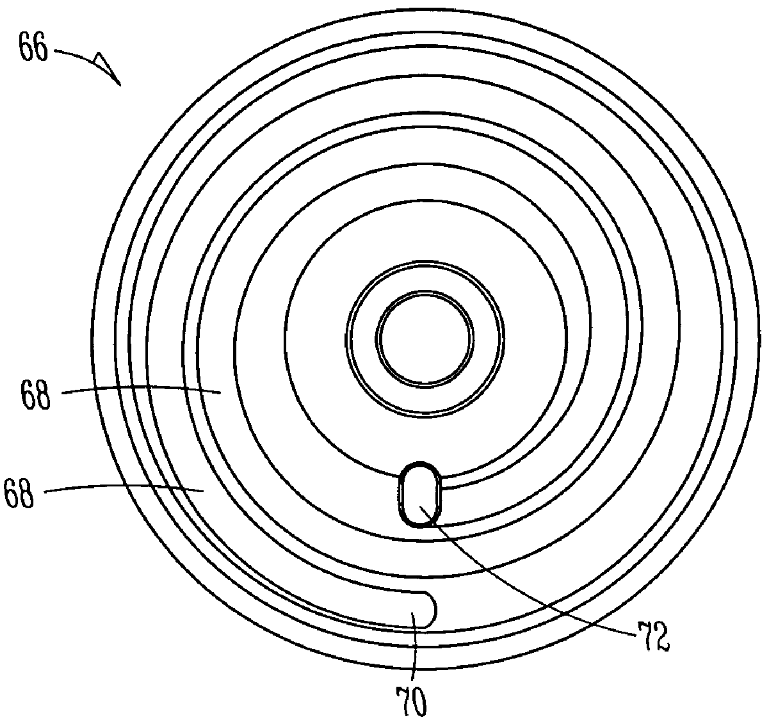
FIG. 12 is an enlarged plan view of a helical groove on the inside surface of an adjustment knob of the operator interface mechanism of the food slicer of FIGS. 1 and 2.

As FIGS. 12 and 13 illustrate, the knob 66 includes a spiral groove 68 formed on its inside surface within which the second end 64 of the second cable 60 rides. The groove 68 starts at a first outward end 70, corresponding to the fully open position of the gage plate 28, and ends at a second inward position formed with a detent or recess 72 corresponding to the fully closed position of the gage plate 28. Thus, the second cable 60 can only move longitudinally along its length (in response to movement of the interlock shaft 54, first cable 46 and disc 44) when the second end 64 of the second cable 60 is aligned with the detent 72. At any other position within the groove 68, the second end 64 of the second cable 60 will not move longitudinally since it is restricted by the groove 68 and knob 66.

Accordingly, if the product table 16 is not in the home position it cannot be removed from the support arm 20 since the disc 44 will not rotate because the first cable 46 cannot move the interlock shaft 54 within the fork 59 to the position illustrated in FIG. 11. If the product table 16 is in its home position, although the interlock shaft 54 could move within the fork 59 in response to rotation of the disc 44 and longitudinal movement of the first cable 46, the second cable 60 prevents movement of the interlock shaft 54 unless the second end 64 of the second cable 60 is aligned with the detent 72 which corresponds to the fully closed position of the gage plate 28.

It will be clear from the above brief description that the product table 16 cannot be removed from the support arm 20 unless the product table 16 is in the home position and the gage plate 28 is fully closed. Any other position of either the product table 16 and gage plate 28 will not allow an operator to remove the product table 16 from the slicer 10. Additionally, once the product table 16 is removed the interlock mechanism is in the engaged position which locks the gage plate 28 and the support arm 20 preventing the gage plate 28 from being opened and the support arm 20 from moving with respect to the slicer 10.

Figure 4:
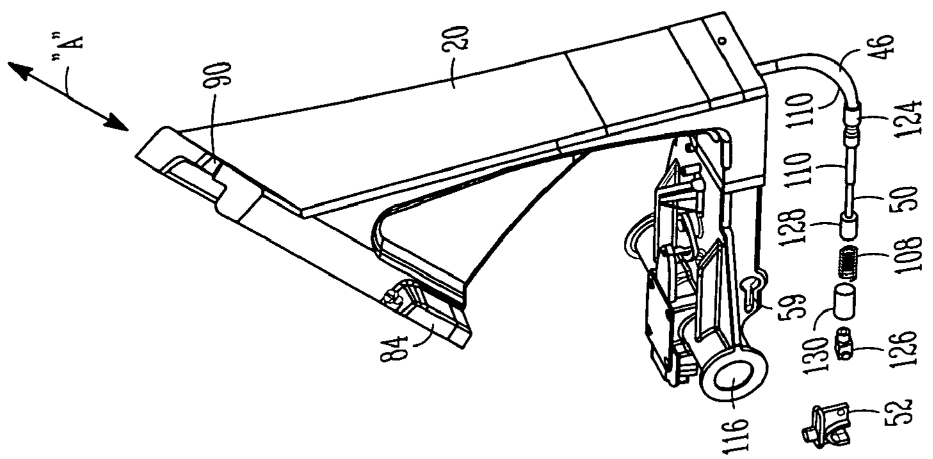
FIG. 4 is a perspective view of the product table support arm of the food slicer of FIGS. 1 and 2 with a partial exploded portion illustrating a portion of the cable assembly of the interlock mechanism.

Details of the components and structure of the interlock mechanism will now be provided. Referring to FIGS. 3 and 4, the underside of the product table 16 includes the pin 40 which is positioned in a direction substantially perpendicular to the direction of installation of the product table 16 to the support arm 20 generally illustrated by arrow "A". The pin 40 is secured a slight distance away from the bottom surface of the product table 16 by opposing mounting members 80 so that the disc 44 can properly engage with the pin 40. It is to be understood, however, that different orientations of the pin 40 with respect to the support arm 20 are possible.

To assist with aligning and securing the product table 16 to a top surface or top cover of the support arm 20, the product table 16 includes opposing substantially "L" shaped flanges 82 that align with corresponding guide members 84 (FIGS. 4, 5 and 7) formed on the support arm 20. The flanges 82 are closed at one end 86 to provide a stop indicating full engagement of the product table 16 with the support arm 20. To fully fix the product table 16 to the support member 20, the product table 16 can include a threaded stud 88 that seats within a groove 90 formed in the support arm 20 where the stud 88 accepts a thumb screw or the like ( not illustrated) when the product table 16 is positioned the fully engaged position with respect to the support arm 20.

Referring generally to FIGS. 5-10, the disc 44 is designed as a substantially circular flat disc with the slot or recess 42 that accepts the pin 40 of the product table 16. The disc 44 is mounted to the support arm 20 at its center 92 by a rod or axle member 94 whose ends are rotatably secured to the support arm 20. Thus, the disc 44 rotates about its center 92 when the interlock mechanism is engaged by the product table 16.

Figure 6:
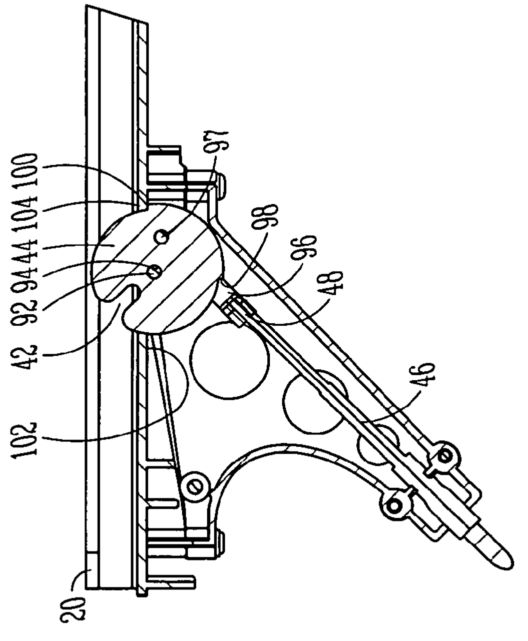
FIG. 6 is a cross-sectional view of the support arm taken along lines 6-6 of FIG. 5 with portions of the support arm cut away.

The disc 44 is connected to the interlock mechanism by a clevis 96 that is mounted to the disc 44 through a rotating connection 97 at a point on the disc 44 that allows for the proper rotational movement of the disc 44 and operation of the interlock mechanism. As FIGS. 6 and 8 illustrate, the disc 44 also includes first and second stops 98 and 100 that limit rotation of the disc 44 upon engagement with first and second portions 102 and 104 respectively of the support arm 20.

To reduce the potential of defeating the interlock mechanism, first and second spring members 106 (FIGS. 9 and 10) and 108 (FIGS. 4 and 11) are included. The two spring members 106 and 108 work in concert to bias the interlock mechanism in the engaged or locked position when the product table 16 is removed. Additionally, the springs 106 and 108, in combination with the geometry of the disc 44 and inclusion of the stop members 98 and 100 ensure that the recess or slot 42 of the disc 44 that accepts the pin 40 of the product table 16 is in the same position every time the table 16 is removed to assist in reinstallation of the table 16.

Figure 10:
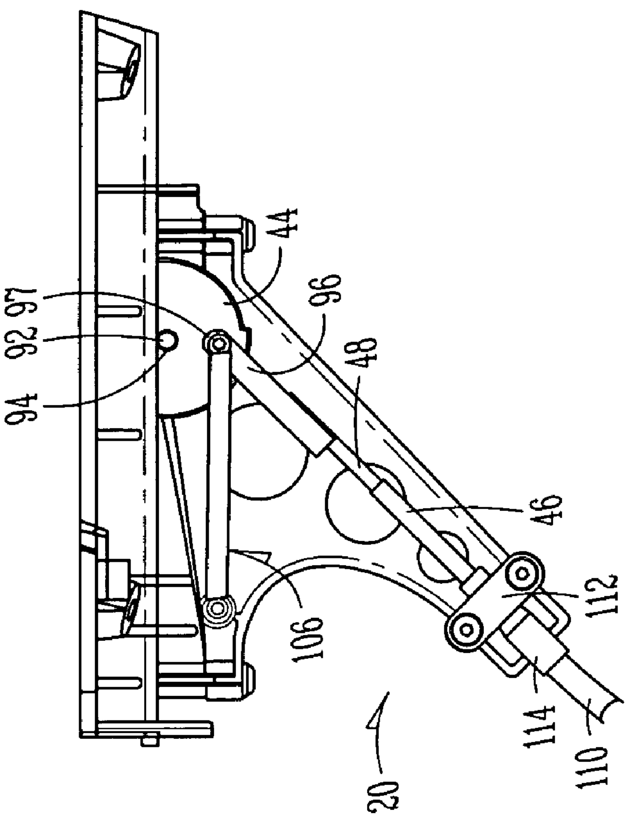
FIG. 10 is a side plan view of the interlock mechanism illustrated in FIG. 7 with portions of the support arm cut away.
Figure 9:
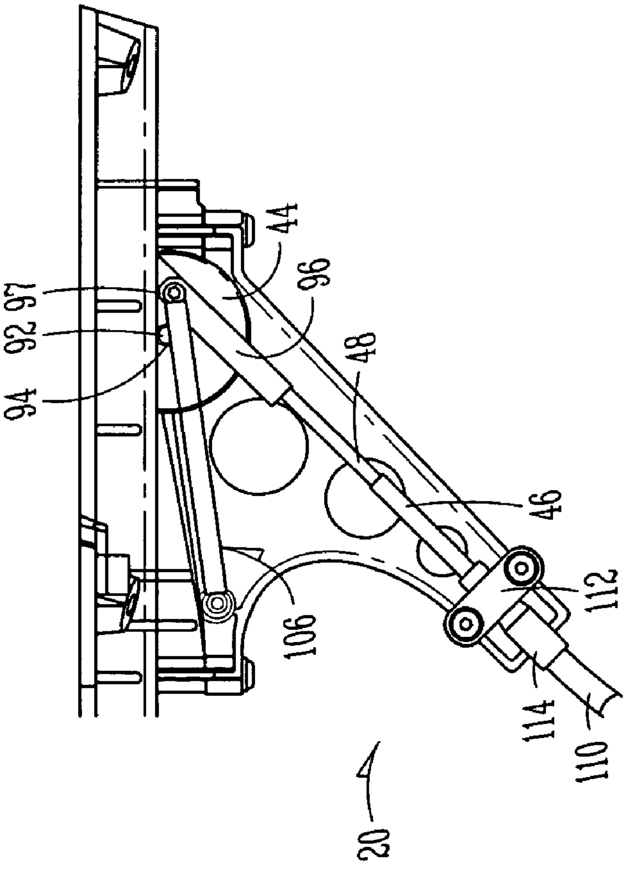
FIG. 9 is a side plan view of the interlock mechanism illustrated in FIG. 6 with portions or the support arm cut away.

As FIGS. 9 and 10 illustrate, the first cable 46 is secured at its first end 48 to the clevis 96 and an outer sheath 110 of the first cable 46 is secured to the top cover of the support arm 20 with a clamp member 112 with the aid of a ferrule 114. Thus, the cable 46 can slide within the sheath 110 without being held by the clamp 112 while being secured to the support arm 20.

As FIG. 4 illustrates, the first cable 46 extends down the interior length of the support arm 20 and exits the bottom of the support arm 20 which is mounted for reciprocating movement with respect to the slicer 10 to enable the product table 16 to move across the cutting blade 24 to slice the food product. As FIG. 11 illustrates, in one embodiment, the support arm 20 includes a channel 116 that accepts a guide rod 118 secured at both ends to the base 22 of the slicer 10 and running from the front of the slicer 10 to the back of the slicer 10. One or more bushings (not illustrated) can be included to assist with the sliding engagement between the support arm 20 and the guide rod 118.

To provide further support for the support arm 20, a roller (not illustrated) can be provided that rides along a rail 120 secured to the underside of the base 22 running parallel to the guide rod 20. It is to be understood, however, that the particular mounting of the support arm 20 to the slicer 10 can vary.

As FIG. 11 illustrates, the sheath 110 near the second end 50 of the first cable 46 is secured to a bottom side of the support member 20 by clamp member 122 with the aid of a ferrule 124. The second end 50 of the first cable 46 is connected to the slider 52 by a connector 126 and extends through a first sleeve 128, the second spring 108 and a second sleeve 130 where the spring 108 is compressed between the first and second sleeves 128 and 130.

The slider 52 is designed to move freely over the interlock shaft 54 while the slicer 10 is in its normal slicing operation without imparting significant friction on the interlock shaft 54. The slider 52 also is designed to move laterally in a direction perpendicular to the length of the interlock shaft 54 where the lateral distance the slider can be moved correlates to the rotation of the disc 44 of the interlock mechanism.

The second end 58 of the interlock shaft 54 is mounted via a pin joint 132 to the base 22 of the slicer 10 for rotation or pivoting movement with respect to the pin joint 132 and at the first end 56 to a guide 134 to form a sliding joint therewith. The slider 52 also serves to support and guide the first end 56 of the interlock shaft 54 and the length of the interlock shaft 54 substantially corresponds to the length of the stroke of the support arm 20 and product table 16.

As mentioned above, the interlock shaft 54 is round in cross section except near the first end 56 where it includes the flat portion 57. Thus, in the disengaged position of the interlock mechanism where the product table 16 is attached to the support arm 20 the interlock shaft 54 rides in a corresponding circular aperture 136 in the fork member 59. When the support arm 20 and product table 16 are in the home position illustrated in FIG. 11, the flat portion 57 can move laterally or perpendicular to the interlock shaft 54 into a slot 138 in the fork member 59. The transition between the flat portion 57 and the circular cross section of the interlock shaft 54 acts as a stop to prevent the movement of the support arm 20 when the product table 16 is removed.

It can be appreciated that with the interlock mechanism of the present invention longitudinal movement of the first cable 46 enables longitudinal movement of the second cable 60 through the coupling provided by the slider 52 and interlock shaft 54 and their associated components only when the gage plate 28 is fully closed and the product table 16 is in the home position. It is to be understood, however, that the particular design, materials and components used to accomplish this movement can vary.

The first end 62 of the second cable 60 is secured to the first end 56 of the interlock shaft 54 by a clevis type connector 140 and is secured to the base 22 of the slicer 10 by a clamp 142 via a ferrule 144. The second cable 60 is then routed through the upstanding portion 24 of the support portion 14 for engagement with the gage plate adjustment mechanism 32.

As FIG. 13 illustrates, the second end 64 of the second cable 60 is secured to the gage plate adjustment mechanism 32 by a connector 146. A housing portion 148 of the mechanism 32 includes a slot or aperture 150 through which the end second end 64 of the second cable 60 extends at all positions of the knob 66 that in turn adjusts the gage plate 28. The knob 66 rotates about an axis 152. The detent 72 and cable end 64 are substantially parallel to the axis 152.

As FIG. 13 illustrates, when the interlock mechanism is in the engaged position with the product table 16 removed and the knob 66 in the position that represents the fully closed position of the gage plate 28, the second cable 60 can move laterally or longitudinally due to the lateral movement of the first cable 46 via the coupling with the slider 52 and interlock shaft 54 so that its second end 64 moves parallel to the axis 152 of the knob 66 and extends into the detent or recess 72 formed in the knob 66. Conversely, when the interlock mechanism is in the disengaged position (not illustrated with respect to the knob 66) the second end 64 of the second cable 60 is retracted from the position illustrated in FIG. 13 to a point just outside of the housing portion 148 but not farther than the depth of the spiral grooves 68.

Accordingly, when the product table 16 is in position on the support arm 20 and the interlock mechanism is in the disengaged position the second end 64 of the cable 60 merely rides in the spiral groove 68 without impeding the rotation of the knob 66 or locking the knob 66 in position. When the product table 16 is in the home position but the knob 66 is not in the position where the gage plate 28 is fully closed, the second end 64 of the second cable 60 prevents the product table 16 from being removed since it will not move substantially parallel to the axis 152 of the knob 66 and forward into the detent or recess 72 in the knob 66.

In summary, with the gage plate 28 in any position but the fully closed position the product table 16 cannot be removed regardless if it is in the home position or not. If the gage plate 28 is in the fully closed position but the product table 16 is not in the home position, the product table 16 cannot be removed.

If the gage plate 28 is in the fully closed position and the product table 16 is in the home position the product table 16 can then be removed. Once the product table 16 is removed, the support arm 20 is locked in the home position and the gage plate 28 cannot be opened.

It will be appreciated that the design of the interlock mechanism provides a simple mechanical interlock that permits the desired motion of the product table 16 of the food slicer 10 while enabling communication to the gage plate control knob 66 positioned on a remote location on the slicer 10.

Numerous modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of the appended claims is reserved. It is intended that the present disclosure be limited only to the extent required by the appended claims and the applicable rules of law.

What is claimed is:

1. A table interlock mechanism for a food slicer, comprising:

at least one cable member in operable communication with a gage plate adjustment mechanism, a distal end of said cable member proximate said gage plate adjustment mechanism being lockable within a portion of said gage plate adjustment mechanism upon longitudinal movement of said cable member to prevent removal of a food product table from the food slicer unless the food product table is in a particular position relative to a cutting blade of the food slicer and said gage plate is in a particular position relative to the cutting blade, wherein said gage plate adjustment mechanism is rotatable about an axis and said longitudinal movement of said cable member is substantially parallel to said axis.

2. A table interlock mechanism for a food slicer, comprising:

at least one cable member in operable communication with a gage plate adjustment mechanism, a distal end of said cable member proximate said gage plate adjustment mechanism being lockable within a portion of said gage plate adjustment mechanism upon longitudinal movement of said cable member to prevent removal of a food product table from the food slicer unless the food product table is in a particular position relative to a cutting blade of the food slicer and said gage plate is in a particular position relative to the cutting blade, wherein said distal end of said cable member rides within a helical groove formed within a portion of said gage plate adjustment mechanism, and wherein said helical groove includes a detent at one position therein, said detent position corresponding to the fully closed position of said gage plate with respect to said cutting blade and defining said particular position of said gage plate.

3. The table interlock mechanism as defined in claim 2, including a second cable member having a first end in operable communication with said product table and a second end in operable communication with said at least one cable member.

4. The table interlock mechanism as defined in claim 2, wherein said gage plate adjustment mechanism is secured proximate to the cutting blade of the food slicer.

5. A food slicer, comprising:

a support member having a base portion and an upstanding portion integrally formed with said base portion;

a rotating cutting blade secured to said upstanding portion for slicing food product;

at least one motor positioned within said upstanding portion for rotating said cutting blade;

a food product table slidably secured to said base portion and movable across said cutting blade for holding product while being sliced by said cutting blade;

an adjustable gage plate for determining the thickness of a food product to be sliced by said cutting blade;

a gage plate adjustment mechanism for adjustment of said gage plate by an operator, said gage plate adjustment mechanism being rotatable about an axis; and a table interlock mechanism for preventing removal of said food product table from the food slicer unless said food product table is in a particular position relative to the cutting blade and said gage plate is in a particular position relative to the cutting blade, said interlock mechanism including at least one cable member in operable communication with said gage plate adjustment mechanism, a distal end of said cable member proximate said gage plate adjustment mechanism being lockable within a portion of said gage plate adjustment mechanism upon longitudinal movement of said cable member substantially parallel to said axis when both said food product table and said gage plate are positioned in said respective particular positions relative to the cutting blade, wherein said interlock mechanism includes a second cable member having a first end in operable communication with said product table and a second end in operable communication with said at least one cable member.

6. The food slicer as defined in claim 5, wherein said distal end of said cable member rides within a helical groove formed within a portion of said gage plate adjustment mechanism.

7. The food slicer as defined in claim 6, wherein said helical groove includes a detent at one position therein, said detent position corresponding to the fully closed position of said gage plate with respect to said cutting blade and defining said particular position of said gage plate.

8. The food slicer as defined in claim 5, wherein said gage plate adjustment mechanism is secured to an upper portion of said upstanding portion of said support member.

* * * * *

UNITED STATES PATENT AND TRADEMARK OFFICE

CERTIFICATE OF CORRECTION

PATENT NO. : 7,637,191 B2
APPLICATION NO. : 11/349354
DATED : December 29, 2009
INVENTOR(S) : Zeeb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 381 days.

Signed and Sealed this

Ninth Day of November, 2010

David J. Kappos
*Director of the United States Patent and Trademark Office*